OTTOLENGUI A. MOSES, OF CHARLESTON, SOUTH CAROLINA.

Letters Patent No. 86,574, dated February 2, 1869.

IMPROVED PREPARED PHOSPHATE.

The Schedule referred to in these Letters Patent and making part of the same.

*To all whom it may concern:*

Be it known that I, OTTOLENGUI A. MOSES, of the city and district of Charleston, and State of South Carolina, have invented a new and improved Prepared Phosphate; and I do hereby declare that the following is a full, clear, and exact description of the construction and operation of the same.

This invention has for its object the production of an improved article of manufacture, by extracting, by a new method, the most valuable fertilizing-ingredients of the so-called South Carolina phosphates and marls, and all of other substances possessing characteristics analogous thereto, that is to say, containing the valuable phosphates of lime, magnesia, &c., intermingled with useless particles of sand, carbonate of lime, the oxides of iron, &c. This object is accomplished by the following process:

In the first place, I wash the crude material, if necessary, in order to remove any impurities that may have attached themselves thereto. After this has been done, I grind the material under water, by means of burr-stones, or a crusher such as is used in chalk and ochre-mills. At the same time, I wash away the finer portions thus ground, leaving behind the coarser and heavier particles of sand, carbonates of lime, oxides of iron, and other comparatively worthless components of the natural rock.

The products of the grinding-process thus conveyed away are deposited, according to their specific gravity, which depends upon their relative fineness, in a series of suitable receptacles prepared to receive and hold them. That portion of the nearly pure and most valuable material which is thus sufficiently comminuted is then thoroughly dried, and put into suitable condition for transportation.

It is evident that, instead of employing a current of water to convey away the finely-ground particles, and separate them from the sand, &c., a blast of atmospheric air, produced either naturally or artificially, might be used.

What I design to do at this stage of the process is simply to avail myself of the difference in specific gravity between the finely-pulverized valuable materials and the coarse, heavy sand, &c., for the purpose of separating one class of materials from the other.

When either washed or blown away from the stones or crusher, the sand will fall first, while the finer and lighter parts will be carried further along. The principle of operation is the same whether water or air be employed as the agent.

I do not intend, as a general thing, to make use of the atmospheric process, but I wish to be at liberty to substitute it for the other when I desire.

The advantages of this new form of fertilizer are:

First, it is produced in the best form for conversion into superphosphates, by manipulation with acids, and for direct application as a fertilizer, whether alone or mixed with saline or ammoniated matters.

Secondly, it contains a minimum of impurities which either are useless or noxious to the process of manufacture.

Thirdly, on account of its comparative freedom from carbonates of lime, &c., and its absorbent qualities, it could be used as a "drier" in the presence of a superabundance or excess of acids or water in the manufacture of other fertilizers.

Fourthly, by crushing it under water, the particles separate more easily than they otherwise would, and, besides, are immediately removed from the grinding-surfaces, in consequence of which the burr-stones, or crushers, are saved from a great deal of unnecessary wear.

Having thus described my invention,

What I claim as new, and desire to secure by Letters Patent, is—

1. The above-described process for producing, as a new article of manufacture, a nearly pure and finely-pulverized fertilizing-phosphate, substantially as herein set forth, and for the purposes specified.

2. The new article of manufacture produced by the above-described process, substantially as set forth.

OTTOLENGUI A. MOSES.

Witnesses:
   CHAS. A. PETTIT,
   A. M. TANNER.